(12) United States Patent
George et al.

(10) Patent No.: US 11,003,872 B2
(45) Date of Patent: May 11, 2021

(54) MOTION-BASED SINGULATION OF RFID TAGGED OBJECT

(71) Applicant: Kindred Systems Inc., San Francisco, CA (US)

(72) Inventors: Kevin George, San Francisco, CA (US); Adrian Martin, Toronto (CA)

(73) Assignee: KINDRED SYSTEMS INC., San Francisco, CA (US)

( * ) Notice: Subject to any disclaimer, the term of this patent is extended or adjusted under 35 U.S.C. 154(b) by 0 days.

(21) Appl. No.: 16/773,624

(22) Filed: Jan. 27, 2020

(65) Prior Publication Data
US 2020/0242315 A1 Jul. 30, 2020

Related U.S. Application Data

(60) Provisional application No. 62/798,278, filed on Jan. 29, 2019.

(51) Int. Cl.
*G06K 7/08* (2006.01)
*G06K 7/10* (2006.01)
*G06K 19/07* (2006.01)

(52) U.S. Cl.
CPC ..... *G06K 7/10475* (2013.01); *G06K 19/0723* (2013.01)

(58) Field of Classification Search
CPC ... H04L 67/12; H04B 17/318; H05B 23/0221; H05B 23/0264; C12Q 1/6806; A61B 90/98; B64C 39/024
USPC ........................ 235/451, 383, 462.46, 472.02
See application file for complete search history.

(56) References Cited

U.S. PATENT DOCUMENTS

| | | | | |
|---|---|---|---|---|
| 10,336,543 | B1* | 7/2019 | Sills | B64D 1/22 |
| 10,726,273 | B2* | 7/2020 | Phan | G06K 9/00771 |
| 10,740,911 | B2* | 8/2020 | Phan | G06T 7/50 |
| 2014/0254896 | A1* | 9/2014 | Zhou | G07F 17/12 |
| | | | | 382/124 |
| 2018/0229843 | A1* | 8/2018 | Costanzo | B65G 13/11 |
| 2020/0167531 | A1* | 5/2020 | Hallock | G06K 7/10445 |
| 2020/0363259 | A1* | 11/2020 | Bergstra | B23P 19/007 |

* cited by examiner

*Primary Examiner* — Daniel St Cyr
(74) *Attorney, Agent, or Firm* — Seed IP Law Group LLP (57) ABSTRACT

Systems and methods are disclosed for identifying one or more RF transponders from a group of RF transponders in an environment based on motions and associated change in radio signal strength. An example method includes causing a target object to move, in accordance with a target path, relative to remaining objects, and obtaining signal strength information of signals emitted from the transponders for a period of time during which the target object is moved and identifying the transponder associated with the target object based, at least in part, on analyzing the signal strength information in accordance with one or more criteria predetermined for the target path.

20 Claims, 4 Drawing Sheets

MOTION-BASED SINGULATION OF RFID TAGGED OBJECT

BACKGROUND

Technical Field

The present disclosure relates to identifying objects using radio-frequency identification (RFID) tags, and more specifically, to identifying an object singulated by a robotic manipulator from a plurality of RFID-tagged objects.

Description of the Related Art

Automated robotics, conveyors, and other motive devices are used in many industrial or logistic applications to sort, relocate, convey, or otherwise manipulate objects in order to achieve a desired goal. Radio-frequency identification (RFID) uses electromagnetic fields to automatically identify and track tags attached to objects. RFID tags typically contain at least three parts: an integrated circuit that stores and processes information and that modulates and demodulates radio-frequency (RF) signals; a means of collecting DC power from the incident reader signal; and an antenna for receiving and transmitting the signal.

The tags contain electronically stored information. Passive tags collect energy from a nearby RFID reader's interrogating radio waves. Active tags have a local power source (such as a battery) and may function farther from the RFID reader. Unlike a barcode, the tags don't need to be within the line of sight of the reader, so it may be embedded in the tracked object.

Existing technologies for identifying or singulating an RFID tag among multiple tags typically require that all of the tags be simultaneously read, or alternatively, a single tag be separated from the remaining tags by a threshold distance so that the remaining tags are not activated. When multiple RFID tags are located within a vicinity of each other, a read volume generated by an interrogating reader may be larger in size than the dimensions of a single tag, thereby causing multiple tags to be read and/or activated. This can result in read collisions and/or interference, reducing the accuracy or reliability for identifying or singulating an object attached to a particular RFID tag.

BRIEF SUMMARY

In some embodiments, a method for singulating an RFID-tagged object among multiple RFID-tagged objects includes causing a robotic manipulator to grasp one or more RFID-tagged objects from a plurality of RFID-tagged objects within an operating environment and causing the robotic manipulator to move the grasped object(s) in accordance with a target path. The method also includes obtaining signal strength data of signals emitted from RFID tags associated with the plurality of objects for a period of time during which the robotic manipulator is moving the grasped object(s), analyzing the signal strength data using one or more rules for singulating an RFID tag among multiple RFID tags, and identifying an RFID tag associated with the grasped object(s) based, at least in part, on the analysis of the signal strength data. In some embodiments, each object of the plurality of objects is associated with a distinct RFID tag.

In some embodiments, the method further includes selecting a motion profile from a plurality of motion profiles to determine the target path. In some embodiments, each motion profile indicates (a) a path to move an object and (b) one or more rules for singulating an RFID tag associated with the object among multiple RFID tags. In some embodiments, the one or more rules include at least one of a threshold, difference, ratio, or pattern of signal strength of signals emitted from an RFID tag.

In some embodiments, the target path indicates at least one of rotary, oscillating, linear, or reciprocating motion. In some embodiments, the target path indicates at least one of acceleration, velocity, or speed of movement. In some embodiments, the target path indicates at least one of a starting or ending location.

In some embodiments, a system includes one or more processors and memory storing contents. The contents, when executed by the one or more processors, cause the system to cause a target object of a plurality of objects to move, in accordance with a target path, relative to remaining objects of the plurality of objects, wherein each object of the plurality of objects is associated with a transponder, obtain signal strength information of signals emitted from the transponders for a period of time during which the target object is moved in accordance with at least a part of the target path, and identify the transponder associated with the target object based, at least in part, on analyzing the signal strength information in accordance with one or more criteria predetermined for the target path.

In some embodiments, the contents further cause the system to select the target path based on at least one of a quantity, locations, or sizes of the plurality of objects. In some embodiments, the one or more criteria includes at least one of descriptive statistics, time series analysis, or an artificial neural network. In some embodiments, the contents further cause the system to generate or change at least a part of the target path in response to a portion of the signal strength information obtained. In some embodiments, the transponders include RFID tags. In some embodiments, the system obtains the signal strength information via one or more RFID readers.

In some embodiments, one or more non-transitory computer-readable media store contents that, when executed by one or more processors, cause the one or more processors to perform actions. The actions include causing a target object of a plurality of objects to move, in accordance with a target path, relative to remaining objects of the plurality of objects, wherein each object of the plurality of objects is associated with a transponder. The actions also include obtaining signal strength information of signals emitted from the transponders for a period of time during which the target object is moved in accordance with at least a part of the target path, and identifying the transponder associated with the target object based, at least in part, on analyzing the signal strength information in accordance with one or more criteria predetermined for the target path.

In some embodiments, causing the target object to move includes controlling a robotic manipulator to grasp the target object. In some embodiments, the actions further include controlling one or more antennas to emit interrogation signals during the period of time, wherein the transponders emit signals in response to the interrogation signals. In some embodiments, the actions further include selecting the target path from a plurality of predetermined paths for moving an object.

In some embodiments, the target object is a first object, the target path is a first path, and the actions further include causing a second object of the plurality of objects to move in accordance with a second path. In some embodiments, the actions further include identifying the transponder associated with the second object based, at least in part, on the moving of the second object in accordance with the second path..

DETAILED DESCRIPTION

The presently disclosed technology is directed towards identifying a single RFID tag from a group of RFID tags in an environment, such as from a bin, pile, heap, storage area, collection, assembly line, etc., based on motions and associated change in radio signal strength.

Illustratively, for a group of RFID tags (e.g., attached to different objects) in an environment, an RFID interrogator (i.e., RFID reader) can activate multiple tags (e.g., tags within the read dimensions of the interrogator). A robotic manipulator can be used to grasp one or more RFID-tagged objects and physically move the object(s) within the environment. The robotic manipulator can move the object(s) according to a motion profile selected from multiple motion profiles.

The motion profiles can be stored in a relational database or other data storage(s). Each motion profile can indicate one or more paths for moving a target object, also referred to herein as "target paths." For example, the motion profile can specify one or more of the following types of motion—rotary, oscillating, linear, and/or reciprocating; variations in acceleration, velocity, and/or speed of movement; starting and/or ending location; or placement of the object within the environment. Thus, the motion profile can include (1) specific motion types, (2) specific scalar, vector, and/or rate of change characteristics, and/or (3) location coordinates within the environment.

As the object(s) are moved relative to the remaining objects in the environment, the RFID interrogator obtains signals emitted from activated tags and the system analyzes the strengths of the signals emitted over a period of time. The analysis can be based on one or more rules, criteria, and/or algorithms indicated in the same selected motion profile for singulating a moving tag from remaining tags based on the signal strengths. The system may generate the motion profiles under different circumstances prior to operational use of the robotic manipulator. In some embodiments, at least some motion profiles are determined and/or updated over time and based at least in part on data collected corresponding to the operational use of the robotic manipulator.

In some embodiments, the robot manipulator is used to assist in pick and place, gripping, identification, and/or sorting functions, and can be in the form of an end-of-arm tooling ("EOAT") that has fingers/grippers that can be powered electrically, hydraulically, mechanically, or pneumatically. In some embodiments, the EOAT can include a suction/vacuum gripping mechanism. The robot manipulator can be utilized within a storage space or an assembly line. The storage space, as used herein, can be a bin, box, sorting station, room, or volume that is used to store, hold, warehouse, or otherwise contain objects.

In some embodiments, the presently disclosed technology is implemented within a retail supply chain warehouse, where the objects include apparel, consumer goods, merchandise, and the like. However, the presently disclosed technology is not intended to be limited to a retail supply chain setting, and the objects can include tools, parts, components, packages, letters, foodstuffs, or the like.

The presently disclosed technology can be used in conjunction with reinforcement learning ("RL") techniques, so that over time, the system can intelligently predict when a particular type, size, or shape of object associated with the tag is required to be grasped, and proactively provide, for example, a supplemental securement, expedited handling, priority routing, etc. This can lead to reduction in the time required for object identification and proper manipulation.

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks and the environment, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references. References to the term "set" (e.g., "a set of items"), as used herein, unless otherwise noted or contradicted by context, is to be construed as a nonempty collection comprising one or more members or instances.

Figure 1:
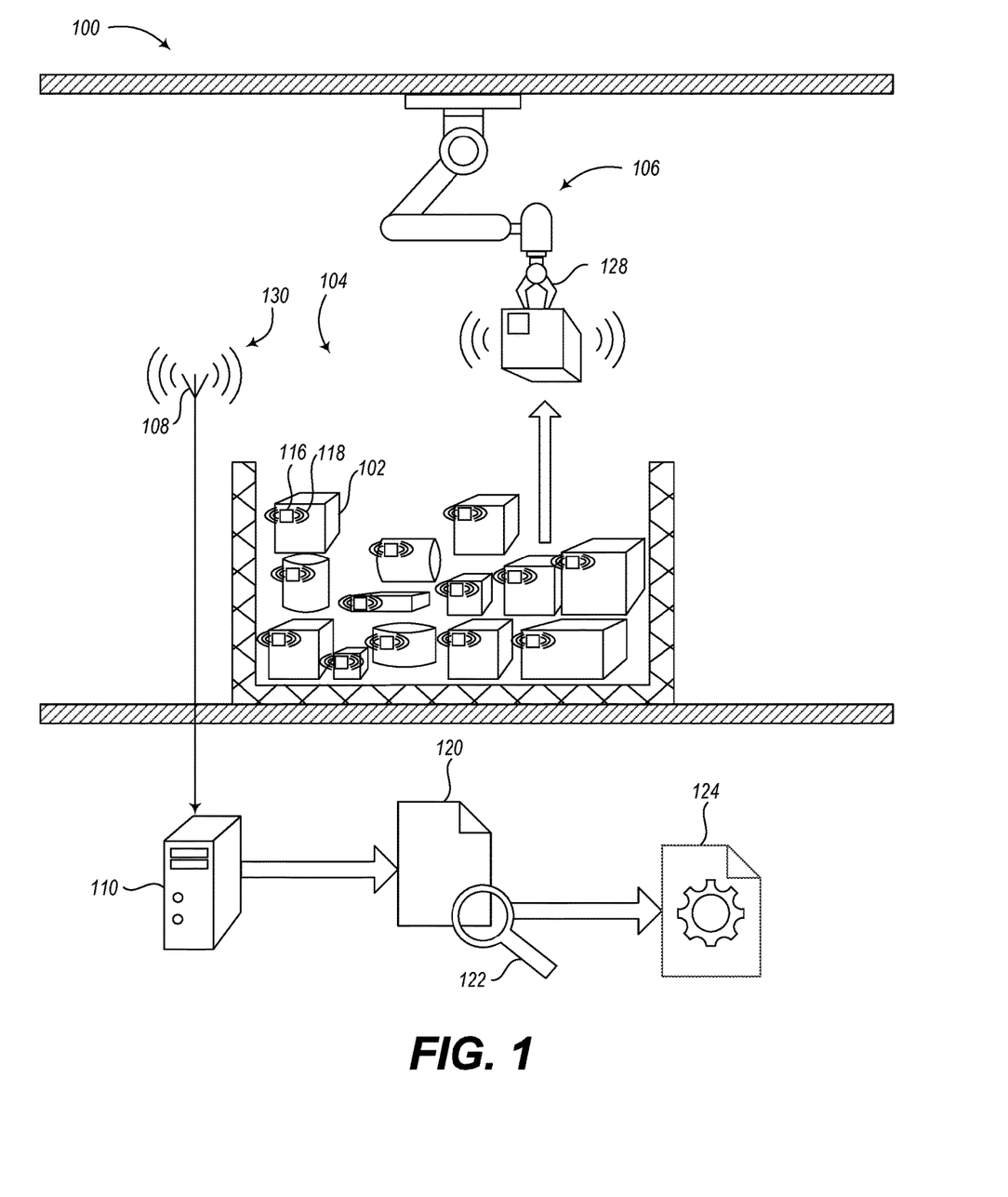
FIG. 1 shows an example environment in which the presently disclosed technology operates in accordance with one or more embodiments.

Referring to FIG. 1, an example environment 100 includes multiple objects 102 collected in a designated area 104, a robotic manipulator 106 positioned to access the designated area 104, one or more antennas 108 positioned proximate to the objects 102 in the designated area 104, and one or more computer systems 110 configured to perform various operations described herein. The objects 102 can differ in type based on physical property, such as a size, a shape, a weight, a function, or a color of the object, a density of the object, a rigidity of the object, and the like, by way of non-limiting example.

The robotic manipulator 106 is configured to grasp and move individual objects 102 as a basis for identifying or singulating the object. Each object 102 is equipped with a radiofrequency (RF) transponder 116 configured to emit an RF signal 118 encoding or otherwise indicating at least a unique identifier associated with the transponder. For example, a transponder 116 can be embodied as a tag, sticker, label, etc., that includes an antenna for receiving and transmitting wireless signals, and an integrated circuit configured to encode an identifier in an RF reply signal 118 transmitted by the antenna. The integrated circuit may be hardwired (e.g., as a field programmable gate array) with information specifying the identifier to be encoded in the RF signal transmitted, or may include or be coupled to non-volatile memory (e.g., read-only memory, solid-state memory) storing information specifying the identifier to be encoded in the RF signal transmitted. The transponders 116, in some embodiments, are RFID tags that are affixed to an exterior surface of the object, embedded within a surface of the object, or provided in an interior compartment of the object.

In at least some embodiments, the RF transponder 116 is a passive transponder not equipped with a battery and instead including circuitry that collects power from an RF interrogation signal for powering the integrated circuit to emit an RF reply signal encoding the identifier. In some embodiments, the transponder 116 may be an active transponder equipped with a battery that powers the integrated circuitry to emit an RF signal encoding the identifier. In such implementations, the active transponder may be configured to periodically emit the RF signal, or detect an RF interrogation signal and emit the RF signal in response. In some embodiments, a passive transponder is preferable to an active transponder in the context of the present disclosure to facilitate synchronization of the RF signals transmitted by the transponders 116 of the plurality of objects 102. For example, active transponders may periodically transmit RF signals such that a first active transponder may transmit RF signals with different timing (e.g., a different frequency, out of phase) than a second active transponder. In some embodiments, the transponder 116 may be a semi-passive transponder equipped with a battery, but which does not transmit an active signal.

The computer system 110 is communicatively coupled with the one or more antennas 108 (e.g., part of one or more RFID readers) and configured to obtain signal information 120 regarding the RF signals received by the antenna(s) 108. The computer system 110 performs analysis 122 on the signal information 120 and identifies the transponder of the object 114 extracted or manipulated by the robotic manipulator 106 based on a result of the analysis 122. The RF signals 118 obtained and the signal information 120 associated thereof are obtained in connection with the motion of the object as it is grasped and/or manipulated by the robotic manipulator 106. Once the object's transponder is identified, the computer system 110 can determine various actions 124 to be performed with respect to the object.

In some embodiments, the environment 100 is located in a manufacturing facility and the objects 102 are parts or components used in a manufacturing process performed in the manufacturing facility. In some embodiments, the objects 102 are containers, such as boxes, crates, barrels, bags, or other receptacle having a structure in which content (e.g., other objects, materials, items, goods) are contained. In some embodiments, the designated area 104 is a container or other partially enclosed volume having sidewalls extending upwardly and defining a cavity in which the objects 102 are to be located for processing. In some embodiments, the designated area 104 is a platform or demarcated area on a floor allocated for processing the objects 102.

In some embodiments, the robotic manipulator 106 includes a movable structure equipped with an end-effector 128 at a distal end of the structure for securing, grasping, and/or otherwise extracting an object 102. The end-effector 128 is a mechanism for selectively securing the object to the distal end to facilitate extraction, transport, rotate, and/or otherwise manipulate the object. Non-limiting examples of the end-effector 128 include a selectively openable and closable gripper, a hook, a suction mechanism using a vacuum seal, an electromagnetic device, or other such mechanism. The end-effector 128 can be particularly configured to secure, grasp, hold, etc., the particular design of the object(s) 102. The movable structure may be, for example, an arm comprising a number of segments and joints that facilitate relative movement between adjacent segments. As another example, the movable structure of the robotic manipulator 106 can be a frame having a cable that is selectively extendable to position the end-effector 128 to secure and grasp the object 102, and that is selectively retractable to extractor separate one object from the remaining objects 102.

The robotic manipulator 106 may be movable relative to a position of the designated area 104. The robotic manipulator 106 shown in the environment 100 is located on a ceiling of the designated area 104; however, the robotic manipulator 106 is not so limited. The robotic manipulator 106 may be configured to move along floors or walls of the designated area, if desired. The robotic manipulator 106 may be part of a mobile robot equipped with legs, wheels, treads, or other motive devices for independent movement of the mobile robot. Additional details regarding the robotic manipulator 106 are discussed with respect to FIG. 2 and elsewhere herein.

The one or more antennas 108 are each located in a fixed position proximate to the designated area 104. The computer system 110 causes the antenna(s) 108 to emit RF interrogation signals 130 having a sufficient power to cause the transponders 116 of the objects 102 to generate and emit the RF signals 118 in response. In some embodiments, the antenna(s) 108 is positioned such that the RF interrogation signals 130 reach every transponder 116 (e.g., to activate it) of the objects 102 in the designated area 104. The robotic manipulator 106 can move an object 102 relative to the antenna(s) 108 within the environment 100. Changes in signal strength of the RF signals 118 relative to the antenna(s) 108 are detected.

The antenna(s) 108 may include one or more types of antenna. For instance, the one or more antennas 108 may include a parabolic antenna, a dipole antenna, a circular antenna, a circular polarization antenna, a cloverleaf antenna, or other similar antenna that can receive or transmit election regular waves of one or more polarizations in that one or more desired frequencies. Each of the one or more antennas 108 may be individually operable by the computer system, via a reader, to selectively send and receive RF signals. In some embodiments, at least some objects 102 are equipped with a real-time location system (RTLS) transponder configured to emit ultra-wideband signals, WiFi signals, or infrared signals which are received by the antenna(s) 108.

Figure 2:
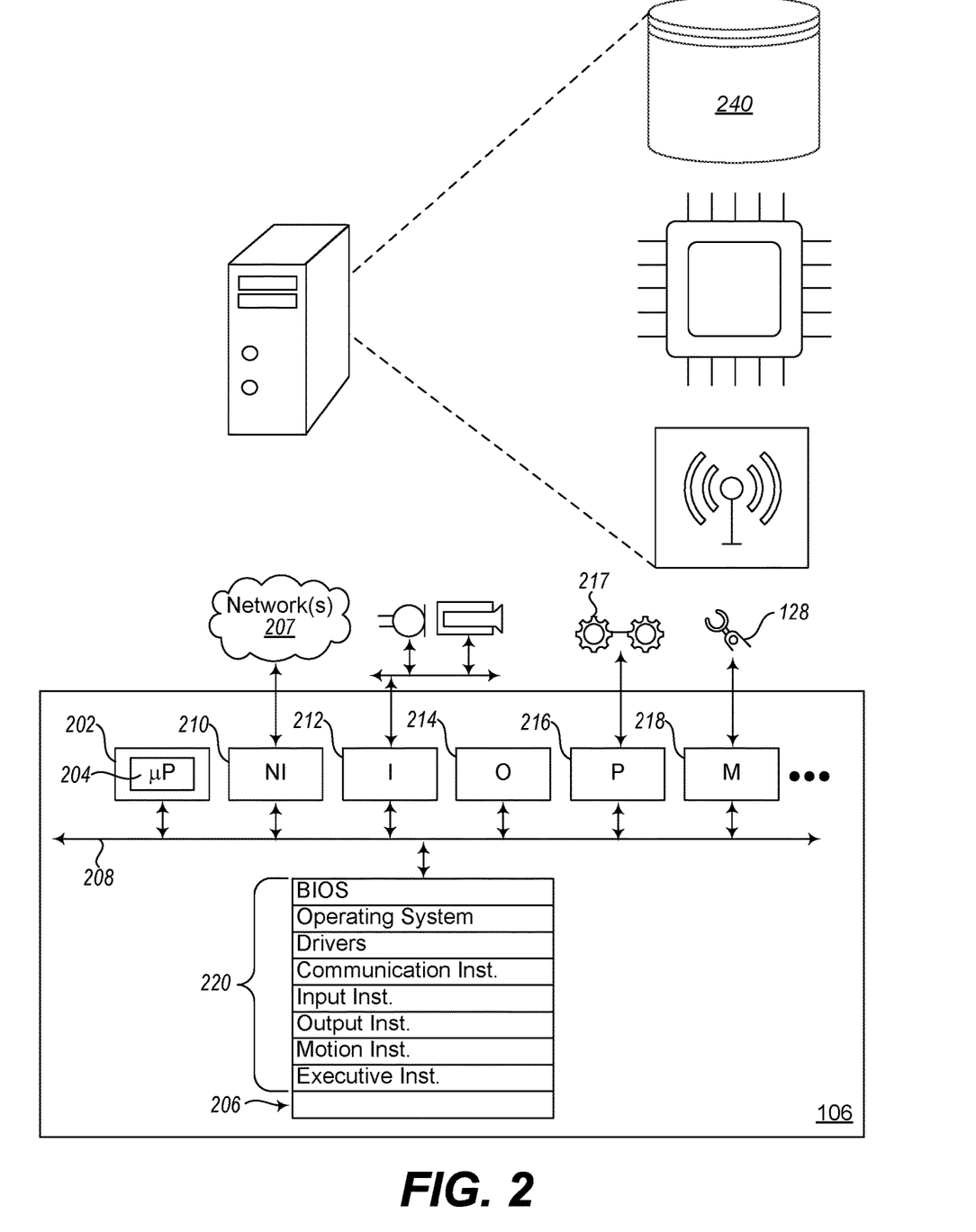
FIG. 2 shows a schematic diagram of a computer system communicatively coupled with components of the environment of FIG. 1.

FIG. 2 shows a schematic diagram 200 of the computer system 110 and the robotic manipulator 106 operating in the environment 100 according to one or more embodiments. As discussed herein, the robotic manipulator 106 and robots, in general, may take any of a wide variety of forms. The robotic manipulator 106 may include at least one body, such as a plurality of connected segments that are movable relative to each other and connected by joints. The robotic manipulator 106 may include a control subsystem 202 that includes at least one processor 204, at least one non-transitory tangible computer- and processor-readable data storage 206, and at least one bus 208 to which the at least one processor 204 and the at least one non-transitory tangible computer- or processor-readable data storage 206 are communicatively coupled.

The at least one processor 204 may be any logic processing unit, such as one or more microprocessors, central processing units (CPUs), digital signal processors (DSPs), graphics processing units (GPUs), application-specific integrated circuits (ASICs), programmable gate arrays (PGAs), programmed logic units (PLUs), and the like. At least one processor 204 may be referred to herein by the singular, but may be two or more processors.

Robotic manipulator 106 may include a communications subsystem 210 communicatively coupled to (e.g., in communication with) the bus(es) 208 and provides bi-directional communication with other systems (e.g., systems external to the robotic manipulator 106) via a network or non-network communication channel, such as one or more network(s) 207 described herein. The communications subsystem 210 may include one or more buffers. The communications subsystem 210 receives and sends data for the robotic manipulator 106, such as sensory information and actuation information. The one or more networks 207 may include wired and/or wireless networks, a local area network (LAN), a mesh network, or other network suitable to convey medications and information described herein. The computer system 110 and the robotic manipulator 106 may or may not communicate over the one or more networks 207.

The communications subsystem 210 may be any circuitry effecting bidirectional communication of processor-readable data, and processor-executable instructions, for instance radios (e.g., radio or microwave frequency transmitters, receivers, transceivers), communications ports and/or associated controllers. Suitable communication protocols include FTP, HTTP, Web Services, SOAP with XML, WI-FI compliant, BLUETOOTH compliant, cellular (e.g., GSM, CDMA), and the like.

Robotic manipulator 106 may include an input subsystem 212. In any of the implementations, the input subsystem 212 can include one or more sensors that measure conditions or states of robotic manipulator 106, and/or conditions in the environment 100 in which the robotic manipulator 106 operates. Such sensors can include cameras or other imaging devices (e.g., responsive in visible and/or nonvisible ranges of the electromagnetic spectrum including for instance infrared and ultraviolet), radars, sonars, touch sensors, pressure sensors, load cells, microphones, meteorological sensors, chemical sensors, or the like. Such sensors can include internal sensors, pressure sensors, load cells, strain gauges, vibration sensors, microphones, ammeter, voltmeter, or the like. In some implementations, the input subsystem 212 includes receivers to receive position and/or orientation information. For example, a global position system (GPS) receiver to receive GPS data, two more time signals for the control subsystem 202 to create a position measurement based on data in the signals, such as, time of flight, signal strength, or other data to effect (e.g., make) a position measurement. Also, for example, one or more accelerometers, gyroscopes, and/or altimeters can provide inertial or directional data in one, two, or three axes. In some implementations, the input subsystem 212 includes receivers to receive information that represents posture. For example, one or more accelerometers or one or more inertial measurement units can provide inertial or directional data in one, two, or three axes to the control subsystem 202 to create a position and orientation measurements. The control subsystem 202 may receive joint angle data from the input subsystem 212 or the manipulation subsystem described herein.

Robotic manipulator 106 may include an output subsystem 214 comprising output devices, such as, speakers, lights, and displays. The input subsystem 212 and output subsystem 214, are communicatively coupled to the processor(s) 204 via the bus(es) 208.

Robotic manipulator 106 may include a propulsion or motion subsystem 216 comprising motive hardware 217, such as motors, actuators, drivetrain, wheels, tracks, treads, and the like to propel or move the robotic manipulator 106 within a physical space and interact with it. The propulsion or motion subsystem 216 may comprise of one or more motors, solenoids or other actuators, and associated hardware (e.g., drivetrain, wheel(s), treads), to propel robotic manipulator 106 in a physical space. For example, the propulsion or motion subsystem 216 may include a drive train and wheels, or may include legs independently operable via electric motors. Propulsion or motion subsystem 216 may move the body of the robotic manipulator 106 within the environment 100 as a result of motive force applied by the set of motors.

Robotic manipulator 106 may include a manipulation subsystem 218, for example comprising one or more arms, end-effectors, associated motors, solenoids, other actuators, gears, linkages, drive-belts, and the like coupled and operable to cause the arm(s) and/or end-effector(s) to move within a range of motions. For example, the manipulation subsystem 218 causes actuation of the robotic arm or other device for interacting with objects or features in the environment 100. The manipulation subsystem 218 is communicatively coupled to the processor(s) 204 via the bus(es) 208, which communications can be bi-directional or uni-directional.

Components in robotic manipulator 106 may be varied, combined, split, omitted, or the like. For example, robotic manipulator 106 could include a pair of cameras (e.g., stereo pair) or a plurality of microphones. Robotic manipulator 106 may include one, two, or more robotic arms or manipulators associated with the manipulation subsystem 218. In some implementations, the bus(es) 208 include a plurality of different types of buses (e.g., data buses, instruction buses, power buses) included in at least one body. For example, robotic manipulator 106 may include a modular computing architecture where computational resources devices are distributed over the components of robotic manipulator 106. In some implementations, a robot (e.g., robotic manipulator 106), could have a processor in an arm and data storage in a body or frame thereof. In some implementations, computational resources are located in the interstitial spaces between structural or mechanical components of the robotic manipulator 106.

The data storage 206 includes at least one non-transitory or tangible storage device. The data storage 206 can include two or more distinct non-transitory storage devices. The data storage 206 can, for example, include one or more a volatile storage devices, for instance random access memory (RAM), and/or one or more non-volatile storage devices, for instance read only memory (ROM), Flash memory, magnetic hard disk (HDD), optical disk, solid state disk (SSD), and the like. A person of skill in the art will appreciate storage may be implemented in a variety of non-transitory structures, for instance a read only memory (ROM), random access memory (RAM), a hard disk drive (HDD), a network drive, flash memory, digital versatile disk (DVD), any other forms of computer- and processor-readable memory or storage medium, and/or a combination thereof. Storage can be read only or read-write as needed. Further, volatile storage and non-volatile storage may be conflated, for example, caching, using solid-state devices as hard drives, in-memory data processing, and the like.

The data storage 206 includes or stores processor-executable instructions and/or processor-readable data 220 associated with the operation of robotic manipulator 106 or other devices. Here, processor-executable instructions and/or processor-readable data may be abbreviated to processor-executable instructions and/or data.

The execution of the processor-executable instructions and/or data 220 cause the at least one processor 204 to carry out various methods and actions, for example via the motion subsystem 216 or the manipulation subsystem 218. The processor(s) 204 and/or control subsystem 202 can cause robotic manipulator 106 to carry out various methods and actions including receiving, transforming, and presenting information; moving in the environment 100; grasping and/or manipulating objects; and/or acquiring data from sensors. Processor-executable instructions and/or data 220 can, for example, include a basic input/output system (BIOS) 222, an operating system 224, drivers 226, communication instructions and data 228, input instructions and data 230, output instructions and data 232, motion instructions and data 234, and executive instructions and data 236.

Exemplary operating systems 224 include ANDROID™, LINUX®, and WINDOWS®. The drivers 226 include processor-executable instructions and/or data that allow control subsystem 202 to control circuitry of robotic manipulator 106. The processor-executable communication instructions and/or data 228 include processor-executable instructions and data to implement communications between robotic manipulator 106 and an operator interface, terminal, a computer, or the like. The processor-executable input instructions and/or data 230 guide robotic manipulator 106 to process input from sensors in input subsystem 212. The processor-executable input instructions and/or data 230 implement, in part, the methods described herein.

The processor-executable output instructions and/or data 232 guide robotic manipulator 106 to provide information that represents, or produce control signal that transforms, information for display. The processor-executable motion instructions and/or data 234, as a result of execution, cause the robotic manipulator 106 to move in a physical space and/or manipulate one or more objects. The processor-executable motion instructions and/or data 234, as a result of execution, may guide the robotic manipulator 106 in moving within its environment via components in propulsion or motion subsystem 216 and/or manipulation subsystem 218. The processor-executable executive instructions and/or data 236, as a result of execution, guide the robotic manipulator 106 the instant application or task for devices and sensors in the environment 100. The processor-executable executive instructions and/or data 236, as a result of execution, guide the robotic manipulator 106 in reasoning, problem solving, planning tasks, performing tasks, and the like.

The instructions 220, as a result of execution by the processor(s) 204, may cause the robotic manipulator 106 to process the objects 102 by successively, randomly, or selectively extracting and/or manipulating individual objects 102 from the designated area 104. The instructions 220 may further cause the processor(s) 204 to process input information received via the input subsystem 212, such as video data captured by a camera or measurements by one or more sensors, and recognize the presence of the objects 102 located in the designated area 104 based on the input information received. Instructions 220 may also cause the robotic manipulator 106 to, while in possession of an object 102 extracted, perform a set of movements and deposit the object in a certain location. In some embodiments, the robotic manipulator 106 may, while in possession of the object 102 extracted, receive a communication from the computer system 110 and manipulate and/or deposit the object 102 as indicated in the communication received. In some embodiments, the robotic manipulator 106 operates independently of the computer system 110 when processing one or more objects 102.

The computer system 110 includes one or more processors 238, memory 240, and a communication interface 242. The memory 240 is computer-readable non-transitory data storage that stores a set of computer program instructions that the one or more processors 238 may execute to implement one or more embodiments of the present disclosure. The memory 240 generally includes RAM, ROM and/or other persistent or non-transitory computer-readable storage media, such as magnetic hard drives, solid state drives, optical drives, and the like. The memory 240 may store an operating system comprising computer program instructions useable by the one or more processors 238 in the general administration and operation of the computer system 110.

The communication interface 242 includes one or more communication devices for transmitting communications and receiving communications via the network 207. The one or more communication devices of the communication interface may include wired communication devices and/or wireless communication devices. Non-limiting examples of wireless communication devices include RF communication adapters (e.g., Zigbee adapters, Bluetooth adapters, ultra-wideband adapters, Wi-Fi adapters) using corresponding communication protocols, satellite communication transceivers, free-space optical communication devices, cellular network transceivers, and the like. Non-limiting examples of wired communication devices include serial communication interfaces (e.g., RS-232, Universal Serial Bus, IEEE 139), parallel communication interfaces, Ethernet interfaces, coaxial interfaces, optical fiber interfaces, and power-line communication interfaces. The computer system 110 may transmit information (e.g., information indicating an operation to be performed involving one or more objects) via the communication interface 242 to the robotic manipulator 106 or other robots, devices, machinery, etc.

The computer system 110 and the robotic manipulator 106 may communicate information over the one or more networks 207 regarding the operations described with respect to the environment 100. Referring to FIG. 1, the computer system 110 may cause the antenna(s) 108 to emit the RF interrogation signals 130, may send a communication over the one or more networks 207 to the robotic manipulator 106 indicating one or more motions or other manipulations to perform, and/or send a communication over the one or more networks 207 to another device in or around the environment 100 indicating an operation involving the object(s) 102.

In some embodiments, the computer system 110 and the robotic manipulator 106 may not communicate over the one or more networks 207. For example, the robotic manipulator 106 may operate autonomously and independent of the computer system 110 to extract and/or manipulate the object(s) 102 from the designated area 104. The computer system 110 may detect or observe changes in radio signal strength or other environmental features, and cause devices, machinery, or robots other than the robotic manipulator 106, to perform operations involving object(s) 102.

Figure 3:
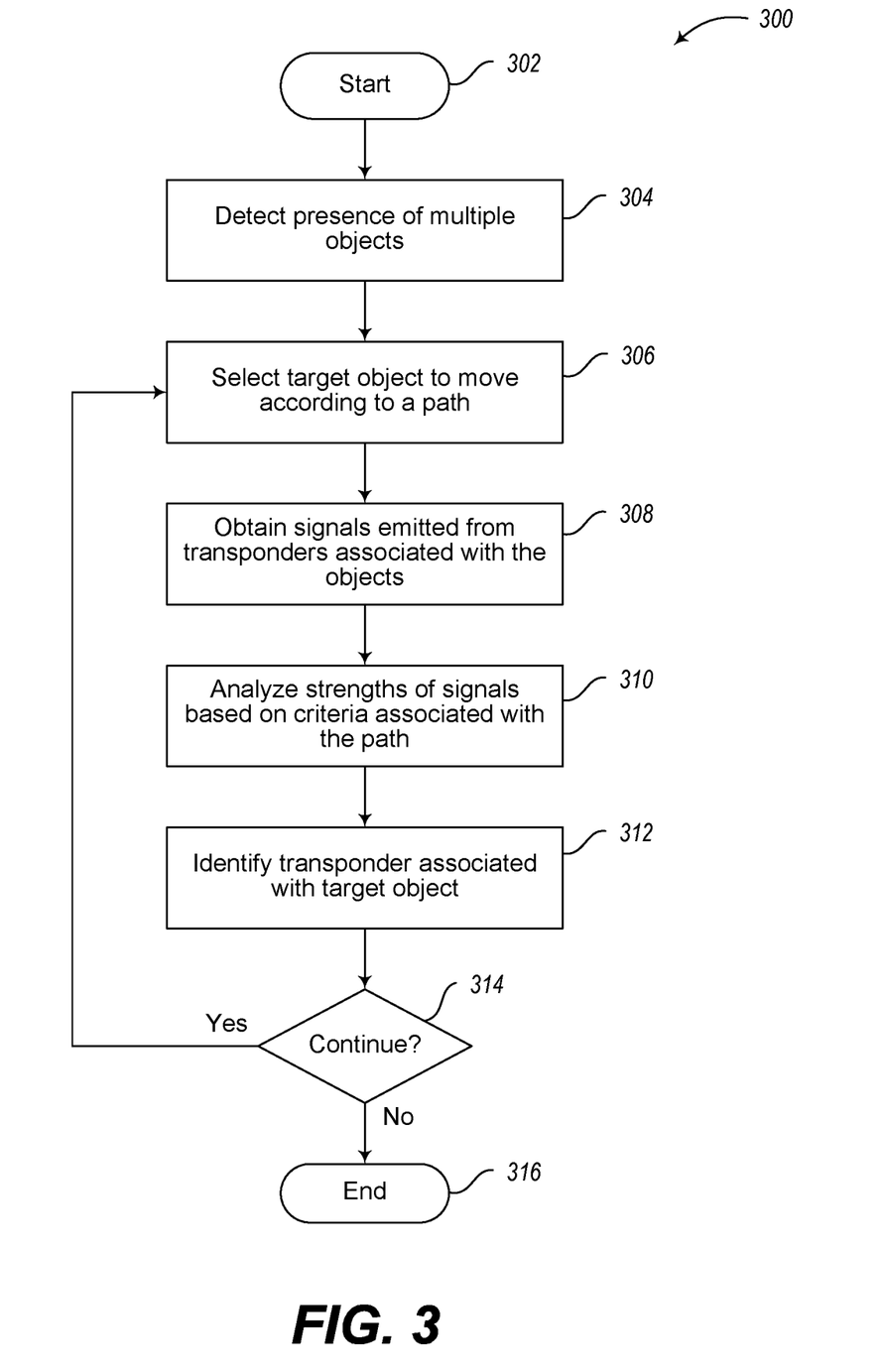
FIG. 3 is a flow diagram of an example method for identifying a transponder associated with a target object, in accordance with one or more embodiments of the presently disclosed technology.

FIG. 3 is a flow diagram of an example method 300 for identifying a transponder embedded, attached, or otherwise associated with a target object, in accordance with one or more embodiments of the presently disclosed technology. Illustratively, the method 300 can be implemented by the computer system 110, the robotic manipulator 106, and/or associated system(s) or service(s).

With reference to FIGS. 3, the method 300 starts at block 302. At block 304, the method 300 includes detecting presence of multiple objects associated with RF transponders. For example, the computer system 110 can control the antenna(s) 108 to emit RF interrogation signal(s) and in response, the antenna(s) 108 can receive RF signals generated and emitted by multiple transponders residing within the read dimension (e.g., covering at least some portion of the designated area 104) of the antenna(s). In some embodiments, the antenna(s) 108 receive signals emitted by one or more transponders without transmitting interrogation signals. In some embodiments, the computer system 110 detects the presence of multiple objects based, in part, on data obtained from other sensor(s) (e.g., camera, radar, LiDAR, or the like).

Each of the detected object is attached, equipped, or otherwise associated with a distinct RF transponder (e.g., RFID tag). The RF signals emitted from each RF transponder can encode or otherwise indicate a unique identifier associated with the transponder. In some cases, the identifier can also indicate a type, content, or other attribute(s) of the object associated with the transponder. While detecting the presence of the objects, the computer system 110 obtains these identifiers as well as determines the strengths of the RF signals emitted from different transponders and received at the antenna(s) 108.

At block 306, the method 300 includes selecting a target object to move according to a path. The target object can be selected randomly or based on the quantity, locations, and/or sizes of the objects. The path can be determined by selecting a motion profile from multiple predetermined motion profiles. Similarly, the selection of the motion profiles can be random or based on the quantity, locations, and/or sizes of the objects. In some embodiments, the computer system 110 determines or estimates the quantity, locations, and/or sizes of the objects based at least in part on data obtained from other sensor(s) (e.g., camera, radar, LiDAR, or the like). In some embodiments, the computer system 110 only uses the detected RF signals (e.g., indicating a distribution of signal strengths associated with different RF transponder identifiers) as a basis for selecting the target object and/or the motion profile.

Each motion profile can indicate (a) one or more paths to move a target object and (b) one or more criteria (e.g., rules, algorithms, and/or models) for singulating an RF transponder associated with the target object among multiple RF transponders. The path can indicate at least one of rotary, oscillating, linear, or reciprocating motion; at least one of acceleration, velocity, or speed of movement; and/or at least one of a starting or ending location. The one or more criteria, for example, can include at least one of a threshold, difference, ratio, or pattern of signal strength of signals emitted from an RF transponder. In some embodiments, the one or more criteria can include at least one of descriptive statistics, time series analysis, or an artificial neural network.

In various embodiments, the motion profiles can be generated based on experiments or past observations. For example, each experiment or observation can correspond to a different configuration of quantity, location, and/or sizes of objects with RF transponders laid out in the designated area 104. Randomly and/or manually generated paths can be used to move different objects under each configuration, and corresponding changes in strength of transponder-emitted signals as received at antenna(s) 108 can be recorded while the object is being moved accordingly. For each different configuration, one or more paths that provide sufficient data of signal strength changes (e.g., having certain level of statistical significance, satisfying certain correlation or entropy thresholds, or the like) to distinguish the transponder in motion relative to other transponders can be stored with a respective motion profile, along with information about the particular configuration and one or more criteria applicable to the signal strength data for singulating the transponder in motion.

Once the target object is selected and the path is determined, the computing system 110 can cause the target object to be moved according to the path. For example, the computing system 110 can control the robotic manipulator 106 to grasp, rotate, tilt, flip, or otherwise move the target object by following the path, relative to the remaining objects.

At block 308, the method 300 includes obtaining signals emitted from the transponders associated with the objects. In some embodiments, the computing system 110 controls the antenna(s) 108 to emit interrogation signals at predetermined intervals or in a continuous manner, during the period of time when the target object is being moved. The transponders associated with the objects emit signals in response to the interrogation signals, which can be received at the antenna(s) 108. In some embodiments, at least some transponders emit signals without responding to any interrogation signal.

In some embodiments, the selected motion profile can indicate one or more paths that are at least partially adaptive or reactive. For example, the motion profile can include instructions that cause the computing system 110 to generate or change at least a part of the path in response to signal strength information obtained. In other words, the target object can be moved in a way reactive and/or responsive to the strength(s) of signals obtained.

At block 310, the method 300 includes analyzing the obtained signal strengths based on one or more criteria associated with the path. As described above, the one or more criteria can be retrieved or otherwise obtained from the selected motion profile. The signal strength analysis can include evaluating signal strength values emitted from individual transponders and/or across multiple transponders.

At block 312, the method 300 includes identifying the transponder associated with the target object based at least in part on the analysis. Illustratively, once the transponder is identified, the computing system 110 can map the identifier(s) encoded or otherwise indicated in the signal emitted from the identified transponder to the target object and perform further actions based thereon. For example, the computing system 110 can confirm the type and/or content of the target object using the identifier(s) and cause the robotic manipulator 106 or other devices or machinery to perform various operations (e.g., sorting, packing, unpacking, transferring, stowing, or the like) with respect to the target object.

Figure 4:
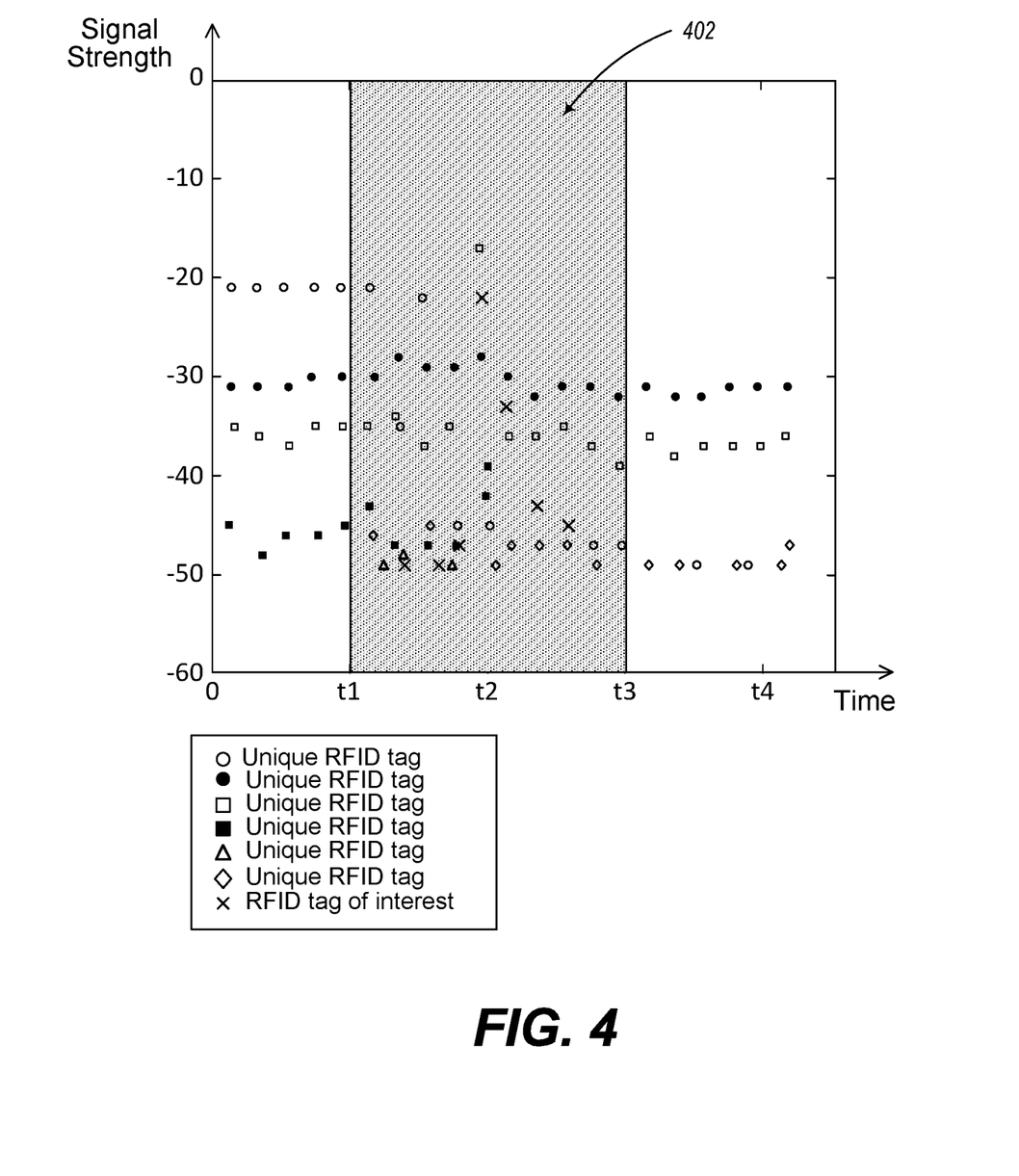
FIG. 4 is an example graph representation of signal strength information, in accordance with one or more embodiments of the presently disclosed technology.

As an example, FIG. 4 is a graph representation of signal strength information as obtained at block 308, in accordance with one or more embodiments of the presently disclosed technology. The graph shows signals emitted from 7 distinct transponders (e.g., RFID tags), which are plotted in accordance with time and signal strength.

Illustratively, one or more criteria associated with the path for analyzing the signals can specify a time window 402 (e.g., between time t1 and time t3) as a focus of the analysis. This time window can be determined in accordance with the path, which instructs the robotic manipulator 106 or otherwise causes the target object to move toward a particular antenna 108 and then away from the antenna, with a smallest distance between the target object and the antenna to occur at time t2. The one or more criteria can specify a signal pattern to look for: signals emitted from the transponder of interest (i.e., the object being moved according to the path) should peak in strength proximate in time (e.g., within a threshold) to t2. The one or more criteria can specify a peak-to-value ratio in signal strength to further the analysis. Based on these criteria, the computing system 110 can analyze the signals and identify the transponder associated with the target object (e.g., the RFID tag of interest as shown).

Referring back to FIG. 3, at block 314, the method 300 includes determining whether to continue identifying other transponder(s). For example, the computing system 110 can determine whether additional objects remain in the designated area 104 to be processed. If additional objects remain to be processed, the method 300 continues and proceeds back to block 306. Otherwise, the method 300 ends.

In some embodiments, other short-range wireless transmission communication protocols may be used instead of, or in conjunction with, RFID. For example, the transponders may include Bluetooth transponders, Bluetooth low energy transponders, Wi-Fi transponders, or optical transponders. In some embodiments, active transponders may be utilized to supplement the use of the passive transponders.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for singulating an RFID-tagged object among multiple RFID-tagged objects, comprising:
    causing a robotic manipulator to grasp at least one RFID-tagged object from a plurality of RFID-tagged objects within an operating environment;
    retrieving a motion profile associated with the at least one RFID-tagged object, the motion profile indicating a path for moving the at least one RFID-tagged object
    causing the robotic manipulator to move the at least one RFID-tagged object in accordance with the path indicated in the motion profile;
    obtaining signal strength data of signals emitted from an RFID tag associated with the at least one RFID-tagged object during movement of the at least one RFID-tagged object along the path;
    analyzing the signal strength data using one or more rules for singulating the RFID tag;
    modifying the path based, at least in part, on the analyzing of the signal strength data; and
    updating the motion profile based, at least in part, on the modifying of the path.

2. The method of claim 1, wherein at least two objects of the plurality of RFID-tagged objects are associated with different RFID tags.

3. The method of claim 1, further comprising selecting the motion profile from a plurality of motion profiles.

4. The method of claim 1, wherein the motion profile further indicates the one or more rules for singulating the RFID tag.

5. The method of claim 1, wherein the one or more rules include at least one of a threshold, difference, ratio, or pattern of signal strength of signals emitted from an RFID tag.

6. The method of claim 1, wherein the path indicates at least one of rotary, oscillating, linear, or reciprocating motion.

7. The method of claim 1, wherein the path indicates at least one of acceleration, velocity, or speed of movement.

8. The method of claim 1, wherein the path indicates at least one of a starting or ending location.

9. A system, comprising:
    one or more processors;
    memory storing contents that, when executed by the one or more processors, cause the system to:
        retrieve a motion profile associated with at least one object of a plurality of objects, the motion profile indicating a path for moving the at least one object;
        cause the at least one object to move, in accordance with a the path indicated in the motion profile, relative to remaining objects of the plurality of objects, wherein each object of at least a subset of the plurality of objects is associated with a transponder;
        obtain signal strength information of signals emitted from the transponders during movement of the at least one object along at least a part of the path;
    analyze the signal strength information in accordance with one or more criteria for singulating a transponder associated with the at least one object;
    modify the path based, at least in part, on the analyzing of the signal strength information; and
    update the motion profile based, at least in part, on the modifying of the path.

10. The system of claim 9, wherein the contents further cause the system to select the motion profile based on at least one of a quantity, locations, or sizes of the plurality of objects.

11. The system of claim 9, wherein the one or more criteria includes at least one of descriptive statistics, time series analysis, or an artificial neural network.

12. The system of claim 9, wherein the contents further cause the system to generate or change at least a part of the path in response to a portion of the signal strength information obtained.

13. The system of claim 9, wherein the transponders include RFID tags.

14. The system of claim 13, wherein the system obtains the signal strength information via one or more RFID readers.

15. One or more non-transitory computer-readable media storing contents that, when executed by one or more processors, cause the one or more processors to perform actions comprising:

retrieving a motion profile associated with at least one object of a plurality of objects, the motion profile indicating a path for moving the at least one object;

causing the at least one object to move, in accordance with the path indicated in the motion profile, relative to remaining objects of the plurality of objects, wherein at least two of the plurality of objects are each associated with a transponder;

obtaining signal strength information of signals emitted from the transponders during movement of the at least one object along at least a part of the path;

analyzing the signal strength information in accordance with one or more criteria for singulating a transponder associated with the at least one object;

modifying the path based, at least in part, on the analyzing of the signal strength information; and     updating the motion profile based, at least in part, on the modifying of the path.

16. The one or more non-transitory computer-readable media of claim 15, wherein causing the at least one object to move comprises controlling a robotic manipulator to grasp the at least one object.

17. The one or more non-transitory computer-readable media of claim 15, wherein the actions further comprise controlling one or more antennas to emit interrogation signals, wherein the transponders emit signals in response to the interrogation signals.

18. The one or more non-transitory computer-readable media of claim 15, wherein the actions further comprise selecting the motion profile from a plurality of motion profiles.

19. The one or more non-transitory computer-readable media of claim 15, wherein the actions further comprise causing an other object of the plurality of objects to move in accordance with an other path.

20. The one or more non-transitory computer-readable media of claim 19, wherein the actions further comprise performing analysis for singulating a transponder associated with the other object based, at least in part, on movement of the other object in accordance with the other path.

* * * * *

UNITED STATES PATENT AND TRADEMARK OFFICE
CERTIFICATE OF CORRECTION

Page 1 of 1

PATENT NO. : 11,003,872 B2
APPLICATION NO. : 16/773624
DATED : May 11, 2021
INVENTOR(S) : Kevin George et al.

It is certified that error appears in the above-identified patent and that said Letters Patent is hereby corrected as shown below:

In the Claims

In Column 13, Claim 1, Line 62:
"RFID-tagged object" should read: -- RFID-tagged object; --.

In Column 14, Claim 9, Line 38:
"with a the path" should read: -- with the path --.

Signed and Sealed this
Twenty-second Day of February, 2022

Drew Hirshfeld
*Performing the Functions and Duties of the*
*Under Secretary of Commerce for Intellectual Property and*
*Director of the United States Patent and Trademark Office*